United States Patent Office 3,766,074
Patented Oct. 16, 1973

3,766,074
MAGNETICALLY PIGMENTED PAINT
Carl V. Brouillette, Oxnard, Calif., assignor to the United States of America as represented by the Secretary of the Navy
No Drawing. Filed Sept. 15, 1972, Ser. No. 289,529
Int. Cl. H01f 1/113
U.S. Cl. 252—62.54  4 Claims

ABSTRACT OF THE DISCLOSURE

A magnetic paint formulation that may be applied to metal surfaces especially such surfaces when immersed in a body of fluid. The magnetic ingredient of the composition is a magnetic iron oxide and when attracted to a magnetized metal material, the paint is intimately drawn onto the surface thereof. The paint comparatively contains little solvent for underwater use.

BACKGROUND OF THE INVENTION

(1) Field of the invention

This invention relates to paint formulations capable of being employed on magnetized underwater metal surfaces.

(2) Description of the prior art

Attempts to apply paint to iron or steel surfaces under water have met with very limited success. Although specially formulated paint can be successfully applied to iron or steel surfaces wet with seawater or fresh water, many problems arise when attempting to apply this paint under water. Such problems during application are disintegration or dispersion of the paint in water, inability to bond to the wet steel or on iron surfaces under water and failure to completely displace water at the surface of the metal. The present invention overcomes these problems and will permit the application of a paint against underwater metal surfaces.

SUMMARY OF THE INVENTION

This invention is concerned with a paint formulation that may be applied below water to magnetized ferrometal surfaces. The characteristic permitting underwater painting is imparted to the formulation by the addition of iron particles (50 microns or less) and the reduction of the solvent content thereof.

A primary object of the invention is to provide a paint formulation capable of being utilized on underwater magnetized ferrometal surfaces.

Another object is to provide a paint formulation intimately attracted to a magnetized ferrometal surface which is thereby drawn into all pits and cracks.

Still another object is to provide a method of painting underwater ferrometal surfaces.

Other objects, advantages and novel features of the invention will become apparent from the following detailed description of the invention.

DESCRIPTION OF THE PREFERRED EMBODIMENT

This invention involves a novel paint formulation that maybe applied to metal surfaces either above or below a fluid surface. However, it is especially applicable to underwater magnetized ferrometal surfaces. The magnetizable pigmentation will give the paint magnetic properties which will accordingly be attracted to a magnetized metal surface where it is intimately drawn into all cracks and pits. After being brushed or otherwise applied to a magnetized underwater metal surface, the paint will continue to cling, completely cure and become well bonded even after the magnetism has been lost from the metal surface. The magnetic pull produced by the magnetized ferrometal surface will cause all air bubbles to be squeezed to the surface of the paint which will leave a pin hole-free paint film.

It is stressed that the present paint formulations must be nearly 100 percent solids containing proportionately little solvent. Also these paint formulations contain a curing agent which is mixed with the paint prior to application. The magnetic iron oxide is the magnetic ingredient of each formulation. The following formulations are of the coal-tar or epoxy variety, however, other types including polyester could also be employed in the concept if necessary.

FORMULA I.—COMPOSITION—COAL-TAR EPOXY

|  | Pounds | Gallons | Percent by weight |
|---|---|---|---|
| Component A—Material: |  |  |  |
| Magnesium silicate | 200 | 8.6 | 16.7 |
| Synthetic silica | 35 | 2.0 | 2.9 |
| Tar at 75% solids [1] | 500 | 51.5 | 41.8 |
| Epoxide resin (90% non-vol) [2] | 275 | 28.9 | 23.0 |
| Magnetic iron oxide [3] | 120 | 2.9 | 10.0 |
| Solvent (xylene) | 66 | 9.1 | 5.5 |
| Total | 1,196 | 103.0 | 99.9 |
| Component B—Curing agent: |  |  |  |
| Tetraethylene pentamine | 25 | 3.0 | 58 |
| Solvent (xylene) | 18 | 2.46 | 42 |
| Total | 43 | 5.5 | 100 |

[1] Softening point of tar 50°–60° C. having an insoluble content (free carbon) of 10–20%.
[2] See Table II, epoxide.
[3] See Table II, magnetic iron oxide.

FORMULA II.—COMPOSITION—EPOXY

|  | Pounds | Gallons | Percent by weight |
|---|---|---|---|
| Component A—Material: |  |  |  |
| Epoxide resin [1] (90% non-vol) | 500 | 51.5 | 29.4 |
| Red lead | 400 | 5.4 | 25.0 |
| China clay [2] | 210 | 9.7 | 12.5 |
| Silica [3] | 320 | 10.7 | 18.7 |
| Magnetic iron oxide [4] | 170 | 5.6 | 10.0 |
| Xylene | 78 | 11.1 | 4.4 |
| Total | 1,678 | 102.0 | 99.9 |
| Component B—Curing agent: |  |  |  |
| Di-ethylene tri-amine | 41 | 5.1 | 42 |
| Xylene | 56 | 7.5 | 58 |
| Total | 97 | 12.6 | 100 |

[1] Epoxide; average molecular weight 450; epoxy equivalent (WPE) 225–290; specific gravity 1.555–1.170.
[2] China clay; specific gravity 2.6, ASTM designation D603.
[3] Silica, pulverized (MIL-S-15192A, Amend 1).
[4] Magnetic iron oxide (e.g., magnaflux dry concentrate 9C red).

The paint is prepared for brush application by mixing Components A and B thoroughly, and allowing an induction period of 20 minutes before brush applying. The mixing ratio for A and B is as shown in Formula I and Formula II; for the coal-tar epoxy of Formula I, 1196 parts by weight of A with 43 parts by weight of B; similarly for epoxy of Formula II, 1678 parts by weight of A with 97 parts by weight of B.

It is to be noted that the weight of magnetic pigmentation can vary but the amount shown in the formulas is sufficient to produce the desired attraction.

Thus, it should be clear that any quantity of components A and B of both formulation I and II may be mixed provided the same ratio is used; 1196 parts by weight of A with 43 parts by weight of B in Formula I and 1678 parts by weight of A with 97 parts by weight of B in Formula II.

Obviously, many modifications and variations of the present invention are possible in the light of the above teachings. It is therefore to be understood that within the scope of the appended claims the invention may be practiced otherwise than as specifically described.

What is claimed is:

1. A magnetic paint formulation for underwater application to magnetized ferrometal surfaces comprising:

(a) Component A, consisting of:

| Material | Pounds | Gallons | Percent by weight |
|---|---|---|---|
| Magnesium silicate | 200 | 8.6 | 16.7 |
| Synthetic silica | 35 | 2.0 | 2.9 |
| Tar, at 75% solids, having a softening point of 50°-60° C., and an insoluble content of free carbon of 10-20% | 500 | 51.5 | 41.8 |
| Epoxide resin, 90% non-vol, having an average molecular weight of 450, an epoxy equivalent of 225-290 WPE, and specific gravity of 1.555-1.170 | 275 | 28.9 | 23.0 |
| Magnetic iron oxide | 120 | 2.9 | 10.0 |
| Xylene | 66 | 9.1 | 5.5 |
| Total | 1,196 | 103.0 | 99.9 |

(b) Component B, consisting of:

| Curing agent | Pounds | Gallons | Percent by weight |
|---|---|---|---|
| Tetraethylene pentamine | 25 | 3.00 | 58 |
| Xylene | 18 | 2.46 | 42 |
| Total | 43 | 5.5 | 100 |

(c) Components A and B being thoroughly mixed prior to utilization.

2. A magnetic paint formulation for underwater application to magnetized ferrometal surfaces comprising:

(a) Component A, consisting of:

| Material | Pounds | Gallons | Percent by weight |
|---|---|---|---|
| Epoxide resin, 90% non-vol, having an average molecular weight of 450, an epoxy equivalent of 225-290 WPE, and specific gravity of 1.555-1.170 | 500 | 51.5 | 29.4 |
| Red lead | 400 | 5.4 | 25.0 |
| China clay, having a specific gravity of 2.6 and ASTM designation D603 | 210 | 9.7 | 12.5 |
| Silica, pulverized | 320 | 10.7 | 18.7 |
| Magnetic iron oxide | 170 | 5.6 | 10.0 |
| Xylene | 78 | 11.1 | 4.4 |
| Total | 1,678 | 102.0 | 99.9 |

(b) Component B, consisting of:

| Curing agent | Pounds | Gallons | Percent by weight |
|---|---|---|---|
| Di-ethylene tri-amine | 41 | 5.1 | 42 |
| Xylene | 56 | 7.5 | 58 |
| Total | 97 | 12.6 | 100 |

(c) Components A and B being thoroughly mixed prior to utilization.

3. The process of the underwater painting of magnetized ferrometal surfaces comprising:

(a) preparing a magnetic paint formulation consisting of (1) Component A, composed of:

| Material | Pounds | Gallons | Percent by weight |
|---|---|---|---|
| Magnesium silicate | 200 | 8.6 | 16.7 |
| Synthetic silica | 35 | 2.0 | 2.9 |
| Tar, at 75% solids, having a softening point of 50°-60° C. and an insoluble content of free carbon of 10-20% | 500 | 51.5 | 41.8 |
| Epoxide resin, 90% non-vol, having an average molecular weight of 450, an epoxy equivalent of 225-290 WPE, and specific gravity of 1.555-1.170 | 275 | 28.9 | 23.0 |
| Magnetic iron oxide | 120 | 2.9 | 10.0 |
| Xylene | 66 | 9.1 | 5.5 |
| Total | 1,196 | 103.0 | 99.9 |

(2) Component B, composed of:

| Curing agent | Pounds | Gallons | Percent by weight |
|---|---|---|---|
| Tetraethylene pentamine | 25 | 3.00 | 58 |
| Xylene | 18 | 2.46 | 42 |
| Total | 43 | 5.5 | 100 |

(b) mixing components A and B thoroughly prior to actual underwater use thereof;

(c) magnetizing the underwater ferrometal surface intended to be painted; and (d) painting said magnetized surface with said formulation.

4. The process of underwater painting magnetized ferrometal surfaces comprising:

(a) preparing a magnetic paint formulation consisting of:

(1) Component A, composed of:

| Material | Pounds | Gallons | Percent by weight |
|---|---|---|---|
| Epoxide resin, 90% non-vol, having an average molecular weight of 450, an epoxy equivalent of 225-290 WPE, and specific gravity of 1.555-1.170 | 500 | 51.5 | 29.4 |
| Red lead | 400 | 5.4 | 25.0 |
| China clay, having a specific gravity of 2.6 and ASTM designation D603 | 210 | 9.7 | 12.5 |
| Silica, pulverized | 320 | 10.7 | 18.7 |
| Magnetic iron oxide | 170 | 5.6 | 10.0 |
| Xylene | 78 | 11.1 | 4.4 |
| Total | 1,678 | 102.0 | 99.9 |

(2) Component B, composed of:

| Curing agent | Pounds | Gallons | Percent by weight |
|---|---|---|---|
| Di-ethylene tri-amine | 41 | 5.1 | 42 |
| Xylene | 56 | 7.5 | 58 |
| Total | 97 | 12.6 | 100 |

(b) mixing Components A and B thoroughly prior to actual underwater utilization;

(c) magnetizing the underwater ferrometal surface to be painted; and (d) painting said magnetized surface with said formulation.

References Cited

UNITED STATES PATENTS

| | | | |
|---|---|---|---|
| 2,456,313 | 12/1948 | Pratt | 106—290 |
| 3,213,026 | 10/1965 | Jordan et al. | 252—62.55 |
| 3,354,653 | 11/1967 | Meijer et al. | 106—281 R |
| 3,383,345 | 5/1968 | Bauer | 260—33.6 EP |
| 3,582,367 | 1/1971 | Miller et al. | 106—281 |
| 3,639,344 | 1/1972 | Kinneman et al. | 260—28 |
| 3,709,730 | 1/1973 | Tsukamoto | 252—62.54 |

DANIEL E. WYMAN, Primary Examiner

A. P. DEMERS, Assistant Examiner

U.S. Cl. X.R.

106—14, 273, 280, 281; 117—235, 238, 252—62.53; 260—28, 33.6 EP.